United States Patent
Nilsson et al.

(10) Patent No.: US 9,657,883 B2
(45) Date of Patent: May 23, 2017

(54) APPARATUS AND METHOD FOR INSTALLING A LINER IN A PIPE

(75) Inventors: Göran Nilsson, Stenhamra (SE); Sam Hedberg, Ingarö (SE)

(73) Assignee: Repiper AB, Molndal (SE)

( * ) Notice: Subject to any disclaimer, the term of this patent is extended or adjusted under 35 U.S.C. 154(b) by 731 days.

(21) Appl. No.: 13/502,404

(22) PCT Filed: Nov. 3, 2010

(86) PCT No.: PCT/EP2010/006697
§ 371 (c)(1),
(2), (4) Date: Apr. 17, 2012

(87) PCT Pub. No.: WO2011/057734
PCT Pub. Date: May 19, 2011

(65) Prior Publication Data
US 2012/0211114 A1 Aug. 23, 2012

(30) Foreign Application Priority Data
Nov. 10, 2009 (SE) ........................................ 0901433

(51) Int. Cl.
*F16L 55/16* (2006.01)
*F16L 55/18* (2006.01)
(Continued)

(52) U.S. Cl.
CPC ........... *F16L 55/18* (2013.01); *F16L 55/1653* (2013.01); *F16L 55/16* (2013.01); *F16L 55/163* (2013.01);
(Continued)

(58) Field of Classification Search
CPC ......... F16L 55/16; F16L 55/18; F16L 55/179; F16L 55/165; F16L 55/1651;
(Continued)

(56) References Cited

U.S. PATENT DOCUMENTS 1,605,782 A * 11/1926 Rota ............................... 138/98
6,102,120 A 8/2000 Chen et al.
(Continued)

FOREIGN PATENT DOCUMENTS

AU 2008202558 1/2009
DE 4417428 11/1995
(Continued)

OTHER PUBLICATIONS

Exhibits A1.1 through A1.5 (dated Apr. 19, 2007 to Oct. 31, 2007) cited and mentioned in an opposition filed in corresponding EP application EP10782540.8.
(Continued)

*Primary Examiner* — Paul R Durand
*Assistant Examiner* — Andrew P Bainbridge
(74) *Attorney, Agent, or Firm* — K. David Crockett, Esq.; Niky Economy Syrengelas, Esq.; Crockett & Crockett, PC

(57) ABSTRACT

An apparatus and method for installing a liner in a pipe, including a flexible tube assembly (2) with a proximal and a distal end, where the proximal end is attached to a proximal collar fitting (3) and the distal end is attached to a distal collar fitting (4). An inflatable bladder (110) is disposed over the tube (2) and the ends of the bladder (110) are secured to the collar fittings (3,4) forming sealed connections with the collar fittings. The proximal collar fitting (3) has connection means to connect to a guide hose (5), and includes at least one conduit for a fluid to inflate the inflatable and deflate bladder.

18 Claims, 8 Drawing Sheets

(51) Int. Cl.
*F16L 55/165* (2006.01)
*F16L 55/1645* (2006.01)
*F16L 55/163* (2006.01)

(52) U.S. Cl.
CPC ..... *F16L 55/1645* (2013.01); *F16L 55/16455* (2013.01)

(58) Field of Classification Search
CPC . F16L 55/1654; F16L 55/1653; F16L 55/164; F16L 55/1645; F16L 55/16455; F16L 55/162; F16L 55/1612; F16L 55/163
USPC ............... 138/97–99, 93; 405/150.1, 184.2; 264/269; 156/287, 293
See application file for complete search history.

(56) References Cited

U.S. PATENT DOCUMENTS

| | | | |
|---|---|---|---|
| 6,276,398 B1* | 8/2001 | Lange | F16L 55/163 138/93 |
| 6,401,815 B1* | 6/2002 | Surjaatmadja et al. | 166/277 |
| 6,701,965 B1* | 3/2004 | Grace | E03C 1/12 138/112 |
| 6,899,138 B2 | 5/2005 | Lundman | F16L 55/134 138/93 |
| 7,631,665 B2* | 12/2009 | Muhlin | 138/98 |
| 7,849,883 B2* | 12/2010 | Manners | F16L 55/1654 138/97 |
| 2003/0066567 A1* | 4/2003 | Manners | 138/98 |
| 2004/0144439 A1 | 7/2004 | Lundman | |
| 2006/0037659 A1* | 2/2006 | Gillam | F16L 55/134 138/97 |
| 2006/0243337 A1 | 11/2006 | Manners | |
| 2007/0272679 A1* | 11/2007 | Lepola | F16L 47/03 219/494 |
| 2010/0212766 A1* | 8/2010 | Kiest, Jr. | F16L 55/1653 138/98 |

FOREIGN PATENT DOCUMENTS

| | | |
|---|---|---|
| DE | 20318292 | 5/2004 |
| EP | 1519100 | 11/2008 |
| EP | 1764211 | 3/2011 |
| EP | 1998099 | 6/2011 |
| WO | WO9319322 | 9/1993 |
| WO | WO2004/079251 | 9/2004 |
| WO | WO2004079251 | 9/2004 |

OTHER PUBLICATIONS

Exhibits A2.1 through A2.3 (dated Feb. 2, 2008 to Apr. 18, 2008) cited and mentioned in an opposition filed in corresponding EP application EP10782540.8.
Exhibits A3.1 through A3.17 (dated Feb. 7, 2008 to Dec. 16, 2008) cited and mentioned in an opposition filed in corresponding EP application EP10782540.8.
Exhibits B1 and B2 (dated Jun. 2008 to Oct. 2008) cited and mentioned in an opposition filed in corresponding EP application EP10782540.8.
Exhibit B3 (dated Jan. 26, 2008) cited and mentioned in an opposition filed in corresponding EP application EP10782540.8.
Exhibits B4.1 through B4.3 (dated Jan. 8, 2006) cited and mentioned in an opposition filed in corresponding EP application EP10782540.8.
Exhibits C1 through C3 (dated Nov. 15, 2008 to Sep. 10, 2009) cited and mentioned in an opposition filed in corresponding EP application EP10782540.8.
Exhibit C4 (dated Feb. 2013) cited and mentioned in an opposition filed in corresponding EP application EP10782540.8.
Exhibit C5 (dated Jan. 2003) cited and mentioned in an opposition filed in corresponding EP application EP10782540.8.
Exhibit EV (dated Dec. 17, 2014) cited and mentioned in an opposition filed in corresponding EP application EP10782540.8.
Grounds for Opposition (dated Apr. 19, 2014) filed in corresponding EP application EP10782540.8.

\* cited by examiner

APPARATUS AND METHOD FOR INSTALLING A LINER IN A PIPE

The present invention relates to an apparatus and to a method for installing a liner in a pipe, in particular an apparatus comprising an inflatable bladder that can expand within the liner in the pipe and to a method for installing a liner in a pipe.

BACKGROUND ART

Various systems are known to repair and renovate drain pipe systems including sewer pipe systems. A number of such systems comprise an apparatus adapted to be pulled through the sewage pipes while carrying a liner to the location in the sewer pipe where the liner is to be installed. The liner is normally heat curable. The heat curable material is soft and flexible before and during installation. When the liner is in the position where it is to be installed the apparatus will press the lining against the walls of the pipe, e.g. by means of an inflatable bladder, and subject the lining to heat. While the inflated bladder presses the lining against the inner wall of the pipe, the heat from the steam or hot air will cause the curing of the liner, which after the curing forms a hard and resistant liner inside the the pipe.

When the liner has been cured the bladder is deflated and the apparatus is removed from pipe.

Such a pipe repair apparatus is disclosed in WO 2004/079251. The disclosed apparatus is suitable for installing a flexible liner into an internal connecting region between a main pipe and a branch pipe. In order to operate the apparatus access to the pipe system via a man-hole is required.

Further, the known apparatuses for installing a liner in a pipe are relatively complicated and bulky and difficult to use, and their large size prevents them from being used in pipes with small inner diameters, especially when these are bends in the pipe, such as pipes in domestic drains.

Consequently, there is a need for an apparatus for installing a liner that is simple to use and can be used in pipes with small diameters.

DISCLOSURE OF THE INVENTION

An object of the invention is to provide an apparatus for installing a liner in a pipe, which apparatus is flexible and has a small cross-sectional area so that it can be used in narrow and bended pipes.

This object is achieved by providing an apparatus for installing a liner in a pipe including pipe bends, the apparatus comprising a proximal collar fitting and a distal collar fitting interconnected by a small cross-sectional area flexible tube or rod, an inflatable bladder, one end of the inflatable bladder being secured to the proximal collar fitting and the other end of the inflatable bladder being secured to the distal collar fitting with the small diameter flexible tube or rod disposed inside the interior of the inflatable bladder, a push-pull-turn hose with a proximal end and a distal end, said distal end of said a push-pull-turn hose is connected in a releasable way to the proximal collar fitting and said push-pull-turn hose is in fluid communication with the interior of the inflatable bladder.

Since the bladder only contains the relatively small cross-section tube or rod, the overall cross-sectional area of the apparatus is small, and in combination with the flexibility of the small cross-sectional area flexible tube or rod provides for a bladder arrangement that is slim and flexible and can pass through narrow and bended or meandering pipe. The flexible but stable push-pull-turn hose provides for a tool to push and position the bladder arrangement effectively. The flexibility of the push-pull-turn hose allows the push-pull-turn hose to pass through narrow and bended pipe and its stability allows it to transmit sufficient push- and rotation force to the bladder arrangement.

The bladder arrangement is simple in construction with only few parts, making it reliable and inexpensive.

In an embodiment there are no other components than the flexible tube or rod in the interior of the inflatable bladder. Thus, a bladder arrangement with a small cross-sectional area and high flexibility is obtained.

In an embodiment the apparatus is provided with a liner disposed over said inflatable bladder.

In another embodiment the push-pull-turn hose is in fluidic connection with the interior of the bladder via a conduit in the proximal collar fitting. Thus an effective connection between the hose and the bladder is provided.

In another embodiment the push-pull-turn hose is flexible enough to go through said pipe bends and stable enough to transmit a pushing force to the proximal collar fitting at the distal end of the push-pull-turn hose and stable enough to transmit rotational force to the proximal collar fitting at the distal end of the push-pull-turn hose.

In yet another embodiment the proximal collar fitting and/or the distal collar fitting comprises two spaced flanges. The flanges facilitate securing the ends of the inflatable bladder to the collar fitting.

In an embodiment the proximal collar fitting and/or the distal collar fitting comprises an area with ribs. The ribs improve securing the ends of the inflatable bladder to the collar fitting.

In an embodiment the proximal collar fitting and/or the distal collar fitting comprises at least one through-going bore that is provided with thread at both ends. Thus, the collar fitting can be easily connected to the small cross-sectional area flexible tube or rod or to the push-pull-turn hose or receive a threaded plug.

In an embodiment the at least one through-going hole is closed with a threaded plug. Thus, a distal collar fitting is provided.

In an embodiment the distal collar fitting is provided with a rounded or tapered end. The rounded or tapered end facilitates navigation of the bladder assembly through the narrow and pipe to be lined, especially through bends.

In an embodiment the fluid communication between the push-pull-turn hose and the interior of the bladder is located in the proximal collar fitting and/or in the distal collar fitting and/or in the small cross-sectional area flexible tube.

The object above is also provided by providing a toolkit for installing a liner in a pipe that includes pipe bends, said toolkit comprising a push-pull-turn hose with a coupling half at its distal end, a proximal collar fitting with coupling halves at each of two opposite ends, a distal collar fitting with a coupling half at one end, a small cross-sectional area flexible tube or rod with a coupling half at both opposite ends that matches the coupling halves on the collar fittings.

Thus, an effective toolkit for use in installing a liner in a narrow and bended pipe is provided, and said toolkit comprises relatively few and simple components whilst it enables installing a liner in pipes all for various dimensions and shapes.

In an embodiment the toolkit further comprises inflatable bladders of different size and shape.

In an embodiment the inflatable bladders are bladders with two open ends.

In an embodiment the toolkit further comprises fasteners for securing the open ends of the inflatable bladder to said collar fittings.

In another embodiment the toolkit further comprises preformed liners of different shape and dimensions.

In yet another embodiment the toolkit further comprises a source of pressurized air, a source of vacuum and a source of hot fluid.

The object above is also achieved by providing a method for installing a liner in a narrow and bended pipe, said method comprising providing a proximal collar fitting and a distal collar fitting interconnected by a flexible and small cross-sectional area tube or rod to create a flexible tube or rod assembly, providing an inflatable bladder with two open ends, inserting said flexible tube or rod assembly into said inflatable bladder, securing one open end of said inflatable bladder to said proximal collar fitting, securing the other open end of the inflatable bladder to said distal collar fitting to form a bladder arrangement, providing a push-pull-turn hose and connecting one end of said push-pull-turn hose to said proximal collar fitting, placing a curable liner over said bladder arrangement, inserting said bladder arrangement with said curable liner into said pipe, and moving said bladder arrangement with said curable liner into a desired position and orientation into said pipe by pushing, pulling and/or turning said bladder arrangement with said push-pull-turn hose.

The flexible tube or rod may be made of any suitable flexible and resistant material and preferably the tube comprises at least one layer of rubber material or other polymer material, such as polyethylene, polybutelene, polystyrene etc. The flexible tube may be a standard tube which is commercially available and sold in standard length. The standard tube may then be cut into a desired length and form a flexible tube corresponding to the liner to be placed in a pipe. The length of the flexible tube may vary from e.g. 50 cm to several meters.

For the purpose of making the flexible tube more resistant the tube is reinforced, preferably with a mesh selected from metal mesh or other fiber mesh, such as polyaramid or natural fibers.

In an embodiment the flexible sleeve is made from elastomer material, e.g. silicon rubber.

In an embodiment the inflatable bladder is able to adapt to liners for lining pipes of various shapes and sizes.

Moreover, the proximal collar fitting and the distal collar fitting are shaped and configured to secure a bladder to the apparatus. The liner is preferably attached to the proximal collar fitting and the distal collar fitting by use of tape or rubber band, e.g. in the groove formed between two flanges on the collar fittings.

According to some embodiments the at least one conduit that communicates with the interior of the bladder is located in the proximal collar fitting and/or the distal collar fitting and/or in the tube. The opening serves to transport fluid to and from the push-pull-turn guide hose to the bladder.

The conduit may be located in the proximal collar fitting or the distal collar fitting or the tube. The tube assemble may of course comprise more than one conduit, e.g. there may be one, two or three conduits in each of the collar fittings, and also several conduits in the tube is possible. In principle the more conduits the tube assembly has, the faster it can inflate the bladder. The conduits may be located only in the collar fittings or only in the tube.

Accordingly, the fluid to inflate the inflatable bladder is lead to the apparatus through the guide hose. The fluid is lead to the tube assembly via the proximal collar fitting connected with the guide hose.

According to an embodiment the proximal collar fitting and the distal collar fitting are substantially identical. This particular embodiment is highly advantageous as the same collar fitting can be used as the proximal collar fitting and the distal collar fitting. This also simplifies the apparatus and makes it very easy to assemble the tube assembly.

Consequently, in a very simple and cost effective embodiment of the apparatus according the invention, the tube assembly comprises the tube, the proximal collar fitting, the distal collar fitting and the inflatable bladder. The inflatable bladder can easily be pulled over this tube assembly and attached thereto. A liner may also be placed over the tube assembly and attached in an easy manner.

The method comprises providing a tube assembly by connecting a flexible tube or rod with a proximal end and a distal end with a proximal collar fitting at the proximal end, and a distal collar fitting at the distal end, disposing an inflatable bladder over the tube and attaching the bladder in sealed connection with the proximal collar fitting and the distal collar fitting, thereby forming a tube assembly.

In an embodiment the method comprises disposing a curable liner over the tube assembly and attach the curable liner to the proximal collar fitting and to the distal collar fitting in the tube assembly, connecting the proximal collar fitting with a guiding hose, guiding the tube assembly into a pipe to be lined, and feeding a fluid to the interior of the sleeve in the assembly to inflate the sleeve and press the liner tightly towards the inner wall of the pipe.

When the curable liner is pressed tightly against the inner wall of the pipe, the liner is allowed to cure.

When the liner is cured, the sleeve can be emptied by deflation and the tube assembly is removed from the lined pipe.

The method provides a very easy and fast way of lining a pipe, e.g. domestic piping. The method requires very few parts to place a curable liner in a pipe and subsequently cure the liner.

By using only a flexible tube or rod, a proximal collar fitting and a distal collar fitting the tube assembly can be made very small and highly flexible. The tube assembly with a curable liner thereon is capable of passing through pipes with inner diameters down to of approximately 45 mm and is also capable of passing through narrow bends in a pipe system to place the curable liner where it is desired.

A tube assembly with a largest diameter of 30 mm can operate in pipes with inner diameters in the range of about 35 mm to about 150 mm. The tube assembly is also capable of passing bends with acute angles exceeding 90 degrees.

The curable liner is preferably a liner made from woven or unwoven felt impregnated with a curable resin. The resin may be self-curing or cured by increased temperature.

According to the method the fluid to inflate the sleeve is preferably selected from air, oil, water or steam, which are fluids that are easy to work with and suitable to inflate the sleeve. The most preferred fluids are air and steam. Air is easily accessible and very environmentally friendly. Steam is very suitable when the resin is cured by heat.

In an embodiment of the method according to the invention, the sleeve and the liner are secured to the collar fitting by a flange. This is done by utilizing the effect of the flange on the collar fitting, i.e. increased friction by stretching the sleeve and the liner by means of the increased diameter of the collar fitting constituted by the flange. When the collar fitting is shaped with flanges, the flange normally defines the largest diameter of the collar fitting and, thus, the largest diameter of the tube assembly.

Further objects, features, advantages and properties of the apparatus according to the invention will become apparent from the detailed description.

BRIEF DESCRIPTION OF THE DRAWINGS

In the following detailed portion of the present description, the invention will be explained in more detail with reference to the exemplary embodiments shown in the drawings, in which.

DETAILED DESCRIPTION OF PREFERRED EMBODIMENTS

Figure 1:
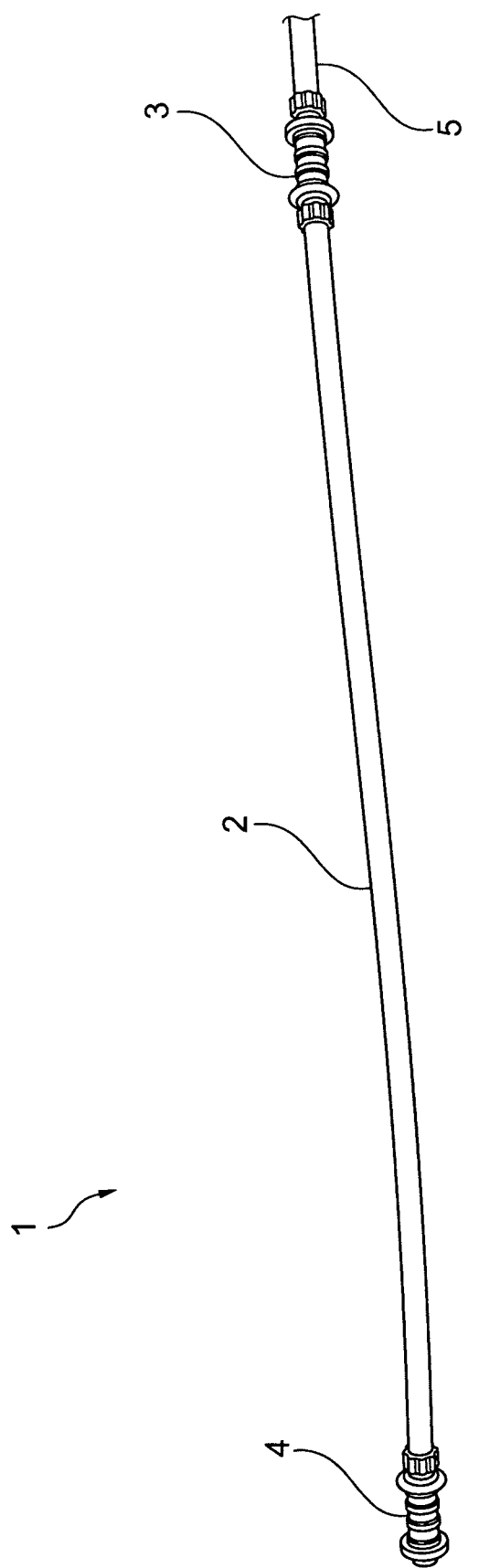
FIG. 1 is a depiction of a tube assembly used in an apparatus for installing a liner according to an exemplary embodiment.

FIG. 1 shows a tube assembly 1 according to an exemplary embodiment of the invention. The device 1 is part of a toolkit for installing a liner in a pipe and the tube assembly includes a flexible tube or rod 2 with a proximal collar fitting 3 connected to its proximal end and a distal collar fitting 4 fitted to the distal end of the flexible tube or rod 2. The proximal collar fitting 3 is also connected with a push-pull-turn rotate guide hose 5.

The flexible tube or rod 2 is a rubber tube reinforced with a steel or other high strength material mesh, which flexible tube or rod 2 can be obtained as a standard product and cut into desired lengths, whereby the length of the tube assembly 1 easily can be adjusted. The flexible tube 2 can be of the same tube material as the push-pull-turn tube, but can also be of different tube material or of a solid rod of suitable flexible material.

The collar fittings 3 and 4 are suitably made from metal, e.g. stainless steel, brass, messing or copper, and preferably the collar fittings are made from aluminum, which is a metal that is easy to adapt to any desired size and shape and also relatively inexpensive.

The push-pull-turn hose 5 is a reinforced rubber tube that is flexible enough to go through 90 deg. bends in a 75 mm pipe but at the same time stable enough to provide a solid pushing force and torsional stability to the able to transmit a substantial rotational force to the tube assembly 1 for turning the latter (and a bladder and a liner installed on the tube assembly) in the correct rotational orientation. Preferably the rubber tube is reinforced with one or more layers of steel mesh, although other reinforcement arrangements such as carbon fiber fabric or mesh can also be used. Hydraulic hoses as used in high pressure hydraulic systems have proven to be very suitable as push-pull-turn hose. A particularly suitable type of hose is Dunlop® Highflex Super Slimline 2410 WP 350 BAR ⅜" 5075 PSI 3010 to 725210 hosing which is a compact 2 wire braid hydraulic hose with a minimum bend radius of 100 mm and sold by the Dunlop Hiflex Company.

Another type of hose that is suitable as a push pull turn hose is 730G 06 ⅜ DIN 20023 EN Greenline biologically easily degradable hydraulic tube with an inner tube of synthetic oil proof rubber, and outer tube of oil and weather proof rubber and armed with 4 spiraling steel mesh inlays. The outer diameter of this hose is 17.9 mm, the inner diameter is 6.4 mm.

Depending to the size of the pipe to be lined and on other factors other similar hoses with a larger outer diameter can be used.

Figure 2:
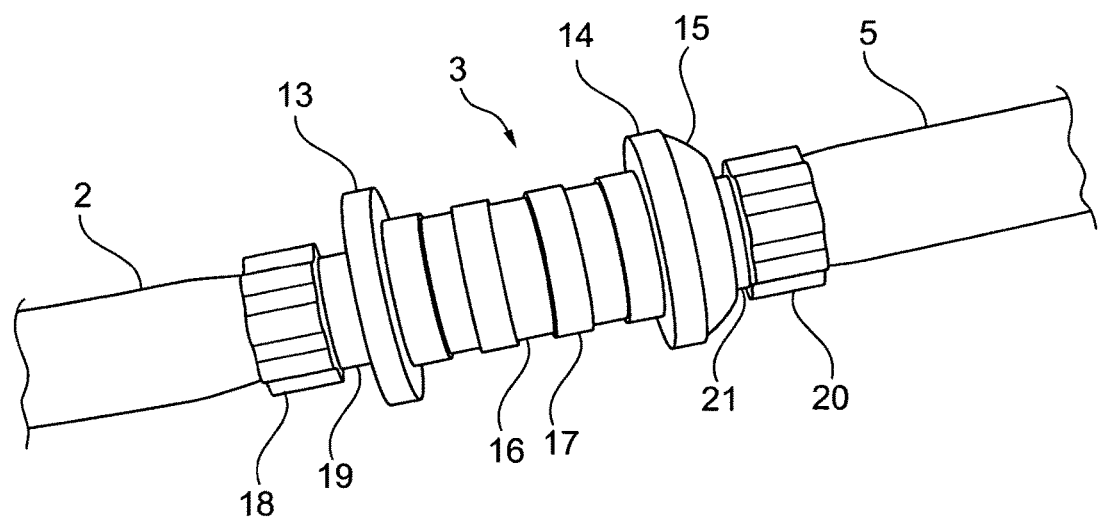
FIG. 2 is a depiction of a proximal collar fitting of the tube assembly shown in FIG. 1.
Figure 2A:
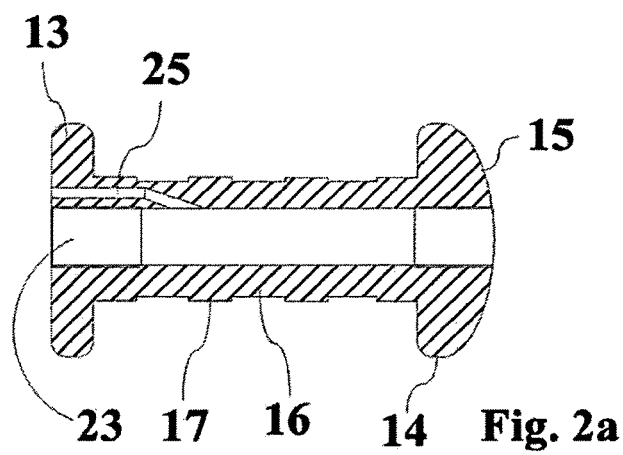
FIG. 2a is a detailed cross-sectional view of the proximal collar fitting of FIG. 2.

FIG. 2 shows the proximal collar fitting 3 connected to the flexible tube 2 and to the push-pull-turn guide hose 5. FIG. 3a is a cross-sectional view of the collar fitting as such. The proximal collar fitting 3 is provided with a first flange 13 located close to the flexible tube 2. The proximal collar fitting 3 is also provided with a second flange 14 shaped with a rounded end 15. The flanges 13 and 14 serve to attach an inflatable bladder (shown in FIGS. 5 to 8). A recess for receiving bladder material is provided between the flanges 13 and 14. The extent of the collar fitting 3 between flange 13 and flange 14 is an area 16 formed with ribs 17. This area 16 and the ribs 17 also serve to improve the secure attachment of the bladder. Moreover, the spacing between the flange 13 and the flange 14 forming a sort of recess in the proximal collar fitting that improves the attachment of a bladder (shown in FIGS. 5 to 8) to the proximal collar fitting 3.

The flexible tube 2 is equipped with a band 18 serving to secure the flexible tube 2 to a threaded connector 19. The threaded connector 19 engages a threaded hole in one end of the proximal collar fitting 3 and thereby connects the flexible tube 2 with the proximal collar fitting 3.

Thus, the threaded coupling 19 forms a coupling half, with the threaded hole in the proximal collar fitting forming the other coupling half.

Also the push-pull-turn guide hose 5 is secured with a band 20 to a threaded connector 21. The threaded connector 21 engages a threaded hole in the other end the proximal collar fitting 3 and thereby the connector 21 connects the guide hose 5 with the proximal collar fitting 3.

Thus, the threaded coupling 21 forms a coupling half, with the threaded hole in the proximal collar fitting 3 forming the other coupling half.

The proximal collar fitting 3 is provided with a through going bore 23 that has threaded endings. Three channels 25 (only one can be seen in FIG. 3a) connect the through going bore 23 to openings at the front face of the flange 13 (cf. FIG. 4)

Figure 3:
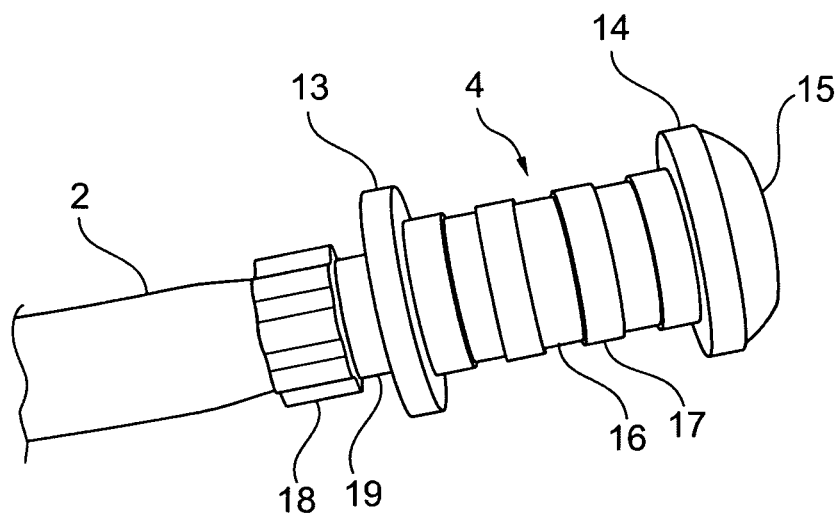
FIG. 3 is a depiction of a distal collar fitting of the tube assembly shown in FIG. 1.
Figure 3A:
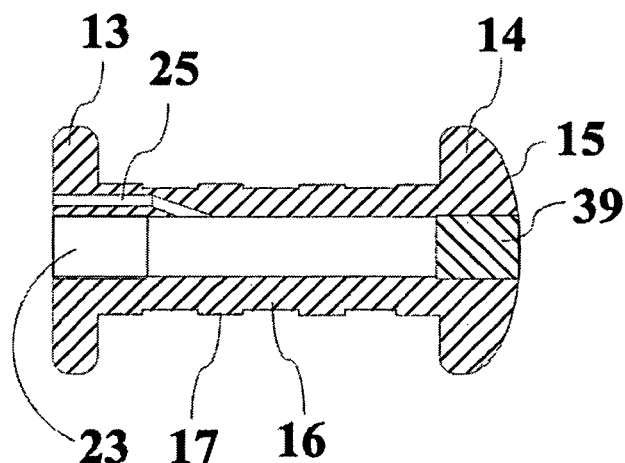
FIG. 3a is a detailed cross-sectional view of the proximal collar fitting of FIG. 3.

FIG. 3 shows a distal collar fitting 4 connected with a flexible tube or rod 2. FIG. 3a is a cross-sectional view of the distal collar fitting 4 as such. The distal collar fitting 4 is essentially identical to the proximal collar fitting 3 with a first flange 13 located adjacent to the flexible tube or rod 2. The distal collar fitting 34 further comprises a second flange 14 having a rounded end 15 and spaced from the first flange 13. The rounded end 15 makes the distal collar fitting 4 suitable to guide the apparatus through a pipe (not shown). The rounded end 15 facilitates the movement of the apparatus into a pipe as it improves the apparatus ability to pass e.g. bends in the pipe. The thread hole in the rounded end 34 is closed with a threaded plug 39.

The flanges 13 and 14 provide grip for the bladder 110 and thereby improve the attachment of the bladder 110 to the distal collar fitting 4. Between the flange 13 and the flange 14 there is an area 16 formed with ribs 17. This area 15 and the ribs 17 also serve to improve the attachment of the bladder 110. Moreover, the spacing between the flange 13 and the flange 14 improves the attachment of the bladder 110 to the distal collar fitting 4.

The flexible tube 2 is equipped with a band 18 serving to fasten the connector 19 to the flexible tube 2. The connector 19 connects the flexible tube 2 with the proximal collar fitting 3.

The distal collar fitting 4 is essentially identical to the proximal collar fitting 3. A difference is that the through going bore 23 of the distal collar fitting 4 is closed at one end with a threaded plug 39.

Figure 4:
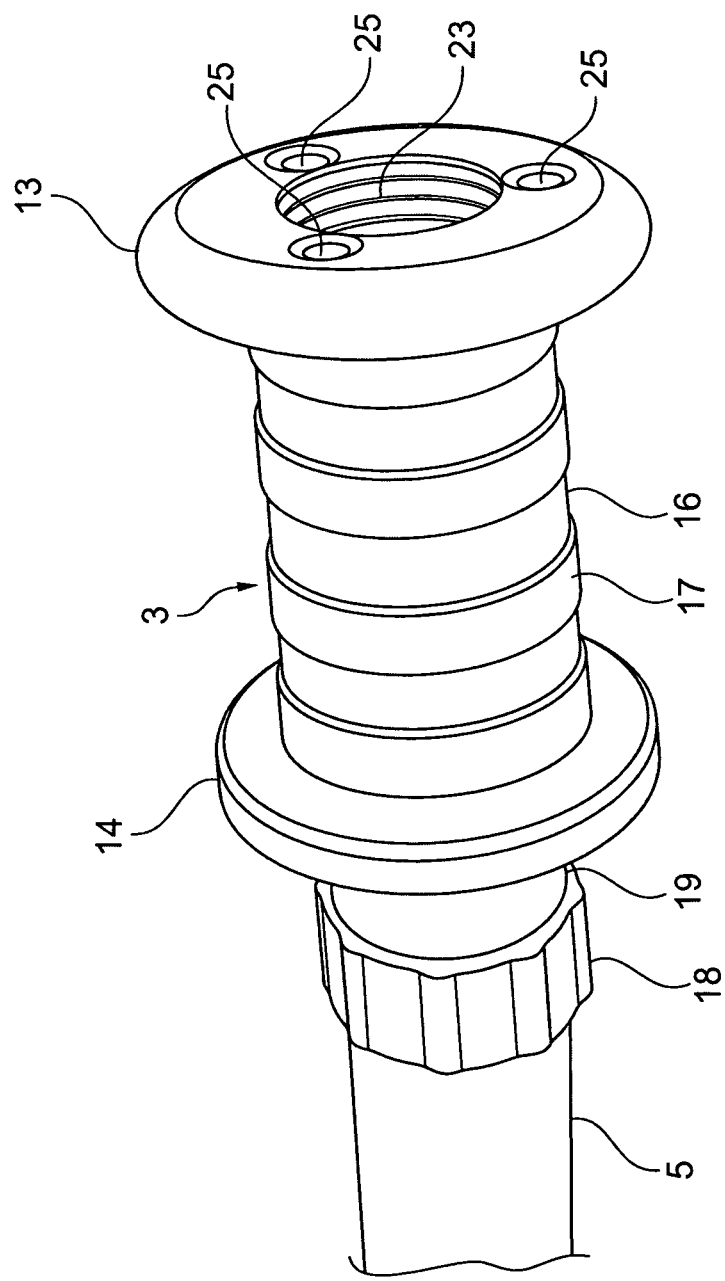
FIG. 4 is a depiction of the collar fitting of FIG. 2 in greater detail.

FIG. 4 is a depiction of the proximal collar fitting 43 showing the main bore 23 and the channels or conduits 25. A collar fitting may serve as both a proximal collar fitting and a distal collar fitting. The bore 23 is threaded at both ends for being able to receive threaded connectors 19,21 or a threaded plug 29. The main bore 23 serves also to transport fluids and the main bore 23 connects to three channels or conduits 25 that have an opening at a front face of flange 13.

The channels 23 are placed symmetrical around the bore 23 collar fitting. The conduits 25 are connected to the through-going bore 23. In this configuration the channels 25 are in fluid communication with the interior of the bladder 110 (FIG. 6) so that fluid can be transported to and removed from the bladder 110 by applying pressure or vacuum, respectively.

When the tool is in its assembled state, the flexible tube 2 will be connected to the free end of the proximal collar fitting 3 as shown in FIG. 4, with a distal collar fitting 4 at the other end of the flexible tube.

Figure 5:
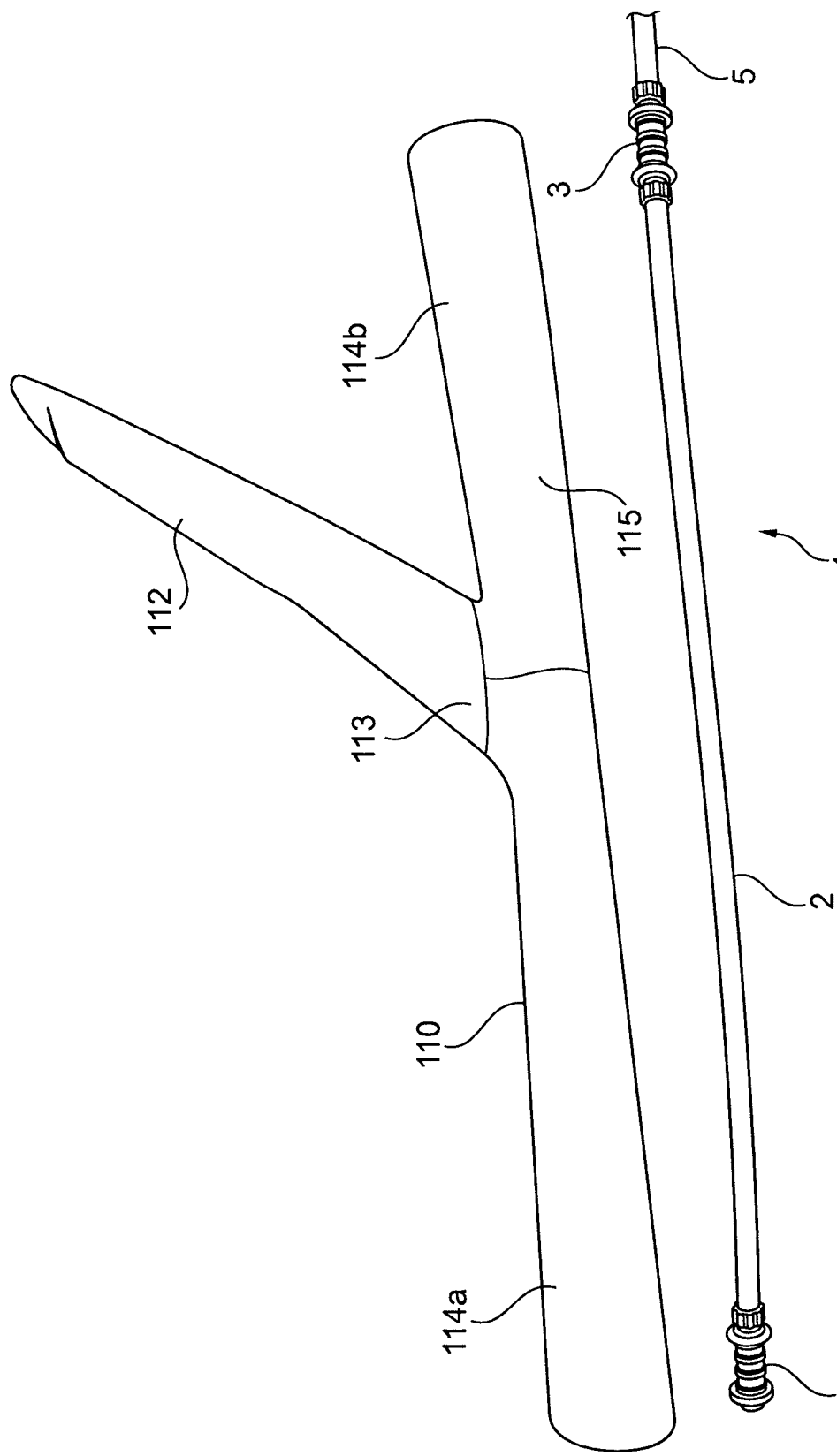
FIG. 5 shows the tube assembly of FIG. 1 and a bladder to be installed to the tube assembly.

A bladder 110 needs to be installed on the tube assembly 1. FIG. 5 shows the tube assembly 1 connected to the push-pull-rotate hose 5. A bladder 110 to be installed on the tube assembly 1 is shown next to the tube assembly 1.

The inflatable bladder 110 is made of a suitable elastic and substantially non-permeable material, such as elastomeric material, such as e.g. rubber or silicone rubber. A preferred material for the bladder is a sheet material with an inner layer of silicon rubber, an intermediate layer of a fiber based fabric and an outer layer of silicone rubber. The fabric is composed of a suitable fiber material, such as for example polymer based fiber, glass fiber, carbon fiber or natural fiber. The fabric limits the maximum expansion of the bladder and gives it high strength whilst the silicon rubber makes the bladder elastic, impermeable, repelling and non-stick.

Another preferred material for the inflatable bladder is has a specific weight of 405 g/m² and is composed 52/48% PA6,6/Silicone.

In the exemplary embodiment the bladder 110 comprises a main body that is made from two parts of bladder sheet material 114*a* and 114*b* that are connected at a weld line 115. The bladder in this embodiment also includes a branch 112 at a 45 deg. angle with the main bladder body. The branch 112 is formed by a third piece of bladder sheet material and connected to the main body of the bladder body at a weld line 113.

The bladder main body has open ends so that the tube assembly 1 can be easily inserted therein whilst the branch 112 has a closed end.

Figure 6:
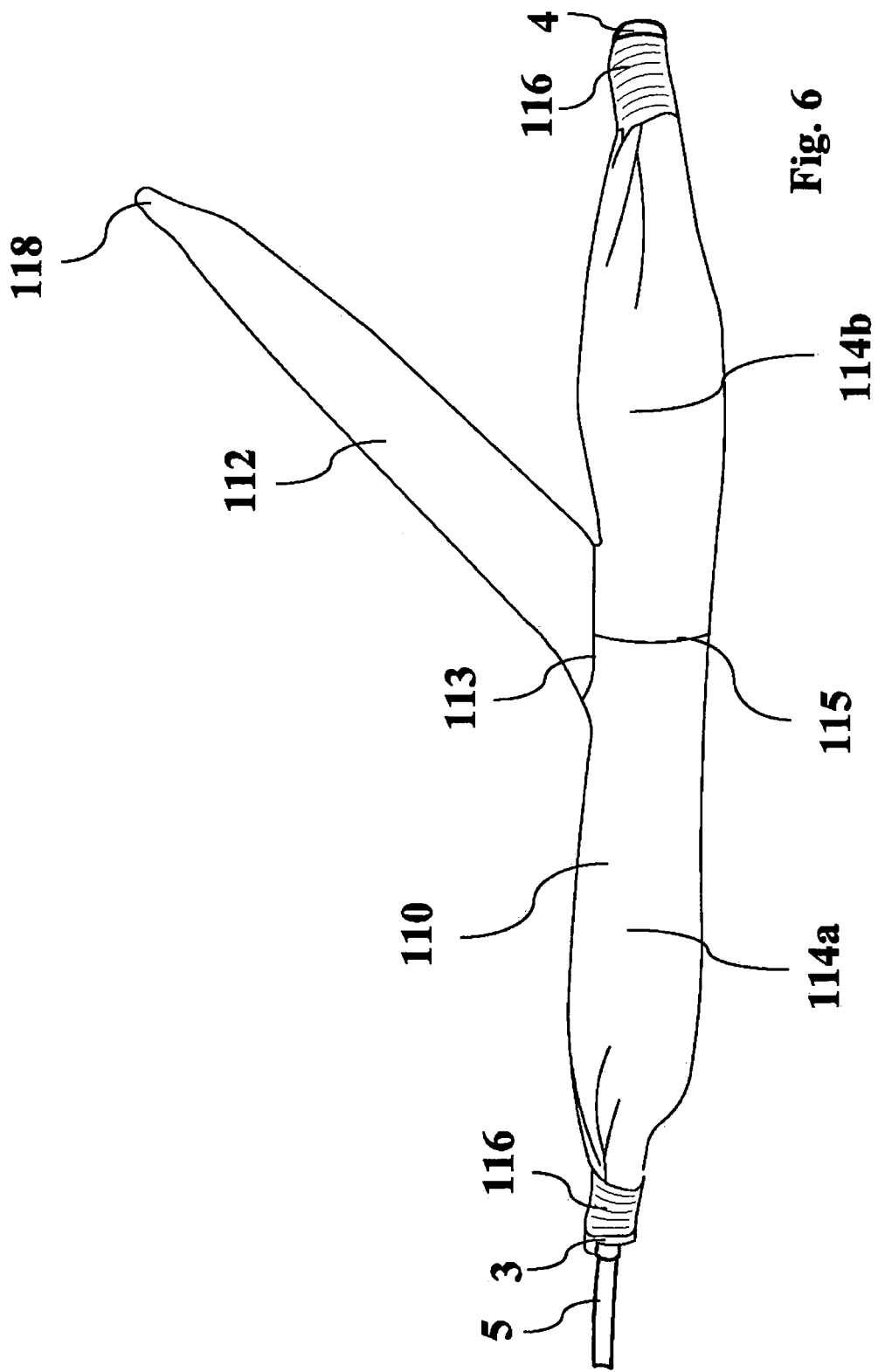
FIG. 6 shows the bladder of FIG. 5 installed to the tube assembly of FIG. 1.

FIG. 6 shows the tube assembly 1 connected to the push-pull-rotate hose 5 and with the bladder 110 installed on the tube assembly.

The visible parts of the tube assembly 1 are the proximal collar fitting 3 and the distal collar fitting 4. The rounded end on the distal collar fitting 4 serves to guide the apparatus with the bladder 110 through a pipe that is to be provided with a liner 120 (FIG. 7) in a smooth and efficient way. The proximal collar fitting 3 is connected to the push-pull-turn guide hose 5 that serves to push the apparatus through a pipe, and to rotate the bladder and a sleeve thereon into the right position. The push-pull-turn guide hose 5 also supplies the fluids to inflate, deflate and heat the bladder 110.

One of the open ends of the bladder 110 is hermetically attached to the proximal collar fitting 3 by wrapping adhesive tape 116 around the end of the bladder at the location of the proximal collar, thereby forcing the end of the bladder 110 into the recess between the flanges 13,14 of the proximal collar fitting 3 to obtain a strong and hermetic connection between the bladder end and the proximal collar fitting 4. Tape 116 is also used to attach the other open end of the bladder 110 to the distal collar fitting 4, thereby urging the bladder material between the flanges 13,14 of the distal collar fitting 4. Instead of adhesive tape other suitable items can be used to tighten the open end of the bladder 110 around the collar fitting, such as e.g. string or wire, a hose clamp or cable tie.

The branch 112 of the bladder 110 is closed at the top 118.

The use of tape 116 to secure the bladder 110 to the flexible tube assembly 2 enables the quick and easy installation of a bladder 110 to the flexible tube assembly and an easy removal from the flexible tube assembly 2 for example in connection with the replacing a damaged bladder 110 with a new bladder 110 or replacing a bladder 110 with another model bladder 110.

Figure 7:
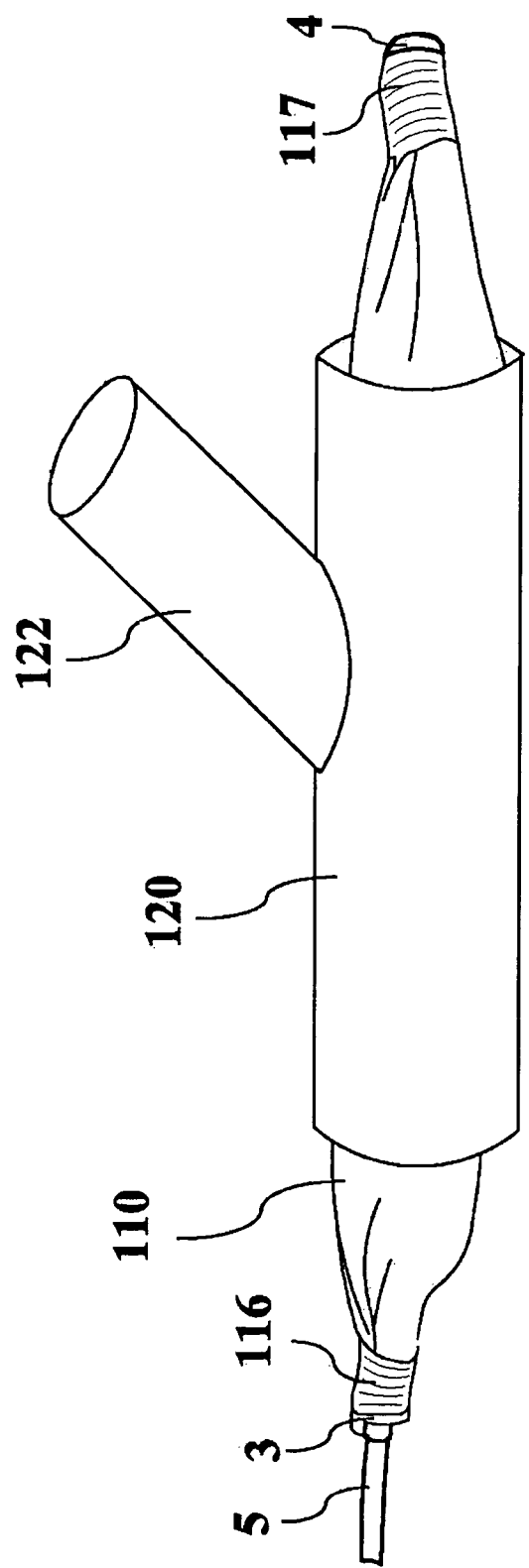
FIG. 7 shows a liner disposed over the bladder that is installed to the tube assembly as shown in FIG. 6.

FIG. 7 shows the tool with the tube assembly 1 connected to the push-pull-turn hose 5 and with the bladder 110 installed. A liner 120 with a branch 122 is disposed over the bladder 110. The branch 112 of the bladder 110 is withdrawn into the main body section of the bladder so that the assembly can be transported easier through the pipe system of the pipe to be lined.

The liner 110 and the branch 112 are preferably made from woven fabric or unwoven fabric (felt), which is impregnated with a suitable curable resin. Preferred materials for the liner are glass fiber, Kevlar and/or carbon fiber. The liners can be preformed or made in situ by wrapping the bladder 110 with fabric.

Since the pipes to be lined can have various diameters and can be branched at 45 deg. angles or 90 deg. angles bladders 110 and liners 120 with different diameters and with branches at either 45 deg. or 90 deg. angles are part of the toolkit that is brought to the site of the pipe or pipe system that is to be provided with lining. Also bladders with two oppositely arranged branches (at 90 deg. angle) and corresponding liners 120 are also part of the toolkit.

Figure 8:
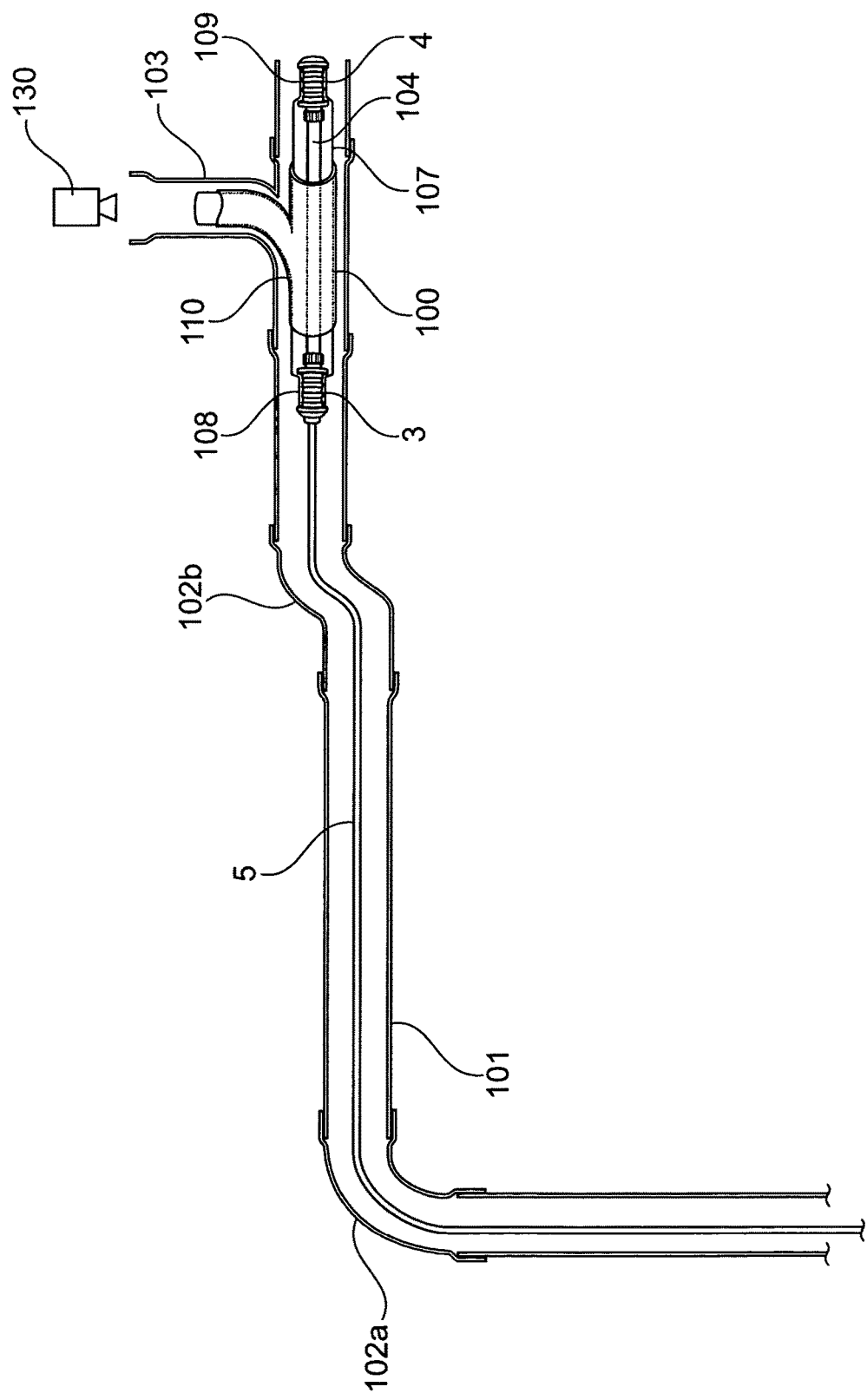
FIG. 8 is a worked open view of an apparatus according to an exemplary embodiment in a pipe that is to be provided with a liner.

FIG. 8 shows the assembly of FIG. 7 in a pipe 101 that is to be provided with a liner The pipe 101 has bends 102*a*, 102*b* and a branch 103.

The installation of a liner 120 is in an exemplary embodiment as follows. A flexible tube 2 with appropriate length is chosen. The flexible tube 2 is provided with a proximal collar fitting 3 and with a distal collar fitting 4 to tube assembly 1. The tube assembly 1 is connected to the push-pull-turn hose 5.

A suitable bladder 110 is chosen and secured to be the tube assembly 1 as described above. A suitable preformed sleeve 120 is chosen and drenched in curable resin. Optionally, the bladder 110 is lubricated. In this example the bladder 110 and the preformed sleeve 120 branch at a 45° angle with the main body of the bladder and sleeve, respectively. The apparatus 100 is then ready to enter the pipe 101.

Vacuum is applied to the interior of the bladder by applying a vacuum to the push-pull-turn hose 5, thereby shrinking the bladder 110 to a minimum volume. The shrunken bladder 110 is inserted into the preformed sleeve 110. Vacuum and also pressure can be applied to the push-pull-turn hose 5 with a conventional compressor (not shown).

The tube assembly 1 with the bladder 110 and the sleeve 120 installed thereon is denoted as the lining apparatus 100.

The lining apparatus 100 is now introduced into the pipe 101 to be lined and pushed through the bends 102a and 102b to the correct position. The push-pull-turn hose 5 is stable enough to be able to push the lining apparatus 100 through the bends, but at the same time the push-pull-turn hose 5 is flexible enough to pass through the bends.

Due to the flexibility of the flexible tube 2, and the small cross-sectional area of the combination of the flexible tube 2 and due to the rounded shape of the front of the distal collar fitting 4 the apparatus 100 is so flexible and slim that it easily passes bends 102a and 102b in the pipe 101 and reaches the branch 103 to be lined with the liner 110.

The torsional stability of the push-cool-turn hose 5 is also sufficient to be able to rotate the lining apparatus 100 to a desired rotational orientation (with the branch of the bladder 110 and the liner directing in the same direction as the pipe branch 103. A camera 130 provides an operator manipulating the push-pull-turn hose 5 with the required feedback to position the lining apparatus 100. Hereto, the output signal of the camera is in an embodiment shown on a display screen (not shown) that is in the view area of the operator.

When the lining apparatus 100 is in the correct position pressure is applied to the bladder 110 by applying pressurized air to the proximal end of the push-pull-turn hose 5. The pressurized air inside the interior of the bladder causes the bladder to expand and thereby push the liner 122 to the interior walls of the pipe to be lined. The branch 112 of the bladder 110 will extend and press the branch of the liner to the inner walls of the pipe branch 103. Next, the resin of the liner 120 is allowed to cure.

If fast curing of the resin in the liner 120 is desired, heat can be applied. One way of applying heat is by pumping hot steam into the bladder 110 via the push-pull-turn hose 5. Before pumping steam into the bladder 110 vacuum can be applied so that the latter is NT and can be easily filled with hot steam. Alternatively, the lining tool can be provided with a pressure relief valve (not shown, but could be placed inside the plug 39) and steam could be forced into the interior of the bladder by using a pressure higher than the pressure at which the relief valve opens, thus enabling the air in the bladder 110 to be evacuated through the distal collar fitting 4.

When the resin has cured, vacuum is applied again so that the bladder 110 retracts and shrinks and the flexible tube assembly 1 and the bladder 110 can be retracted by pulling the push-pull-turn hose 5.

Normally, the lining apparatus 100 can be pushed upwards in a pipe system towards the ceiling of a room or roof of a building and it can be pushed downward in a pipe system towards the cellar of a building.

The lining apparatus 100 is easy to use, inexpensive and very simple to construct. The apparatus 100 can be used in pipes with very small diameters, i.e. with inner diameters down to approximately 35 mm, but it can also be used in larger pipes with a diameter of up to approximately 300 mm. The lining apparatus 100 is also capable of passing bends in a pipe with acute angles exceeding 90 degrees.

Thus, a very simple and cost effective lining 100 apparatus and toolkit for providing a liner 120 in a branched or non-branched pipe system is provided. The toolkit includes the push-push-turn hose 5, a selection of flexible tubes 2, collar fittings 3,4, a selection of inflatable bladders, and a selection of preformed sleeves. The toolkit may include several push-cool-turn hoses 5 with different diameters and different bending radius and flexibility.

It is noted that the flexible tube 2 can be replaced by a flexible rod (not shown) of suitable material such as for example an elastomeric material, optionally fiber reinforced.

The teaching of this invention has numerous advantages. Different embodiments or implementations may yield one or more of the following advantages. It should be noted that this is not en exhaustive list and there may be other advantages which are not described herein. One advantage of the teaching of this application is that it provides for a very flexible and cost effective apparatus and toolkit for installing a liner in a pipe. The apparatuses according to the invention are easy to manufacture in different sizes and lengths depending on the actual need. The apparatuses are very flexible and do not require man-holes or other complicated accesses to the pipe system.

Moreover, the invention provides a method for installing a liner in a pipe by use of the apparatus according to the invention.

Although the teaching of this application has been described in detail for purpose of illustration, it is understood that such detail is solely for that purpose, and variations can be made therein by those skilled in the art without departing from the scope of the teaching of this application.

It should also be noted that there are many alternative ways of implementing the apparatuses of the teaching of this invention.

The term "comprising" as used in the claims does not exclude other elements or steps. The term "a" or "an" as used in the claims does not exclude a plurality. The single processor or other unit may fulfill the functions of several means recited in the claims.

The invention claimed is:

1. An apparatus for installing a liner (120) in a pipe (101) for domestic piping including multiple pipe bends (102a, 102b), said pipe (101) having an inner diameter in the range of 35 mm to about 150 mm, said apparatus so flexible and slim that it easily passes said bends in said pipe, said apparatus comprising:
   a tube assembly (1) comprising:
      a proximal collar fitting (3) and a distal collar fitting (4) interconnected by a small cross sectional area flexible tube or rod (2), and
      an inflatable bladder (110) at one end of the inflatable bladder being secured to the proximal collar fitting (3) and at the other end of the inflatable bladder being secured to the distal collar fitting (4) with the small diameter flexible tube or rod (2) disposed inside the interior of the inflatable bladder (110), said bladder (100) is made of a suitable elastic and substantially non-permeable elastomeric material and comprises a layer of fiber based fabric; and
   a single push-pull-turn hose (5) with a proximal end and a distal end, said single push-pull-turn hose (5) being a reinforced rubber hose with one or more layers of steel or carbon fiber mesh, thereby ensuring that said single push-pull-turn hose (5) is flexible enough to go through 90 degree bends in a 75 mm pipe but at the same time stable enough to provide a solid pushing force and torsional stability to be able to transmit a substantial rotational force to the tube assembly (1) for turning the latter, wherein said distal end of said push-pull-turn hose (5) is connected in a releasable way to the proximal collar fitting (3) and said push-pull-turn hose (5) is in fluid communication with the interior of the inflatable bladder.

2. An apparatus according to claim 1, wherein there are no other components than the flexible tube or rod (2) in the interior of the inflatable bladder (110).

3. An apparatus according to claim 1, wherein a liner is disposed over said inflatable bladder (110).

4. An apparatus according to claim 1, wherein said single push-pull-turn hose (5) is in fluidic connection with the interior of the bladder (110) via a conduit (25) in the proximal collar fitting (3).

5. An apparatus according to claim 1, wherein said single push-pull-turn hose (5) is flexible enough to go through said pipe bends (102a, 102b) and stable enough to transmit a pushing force to the proximal collar fitting (3) at the distal end of the push-pull-turn hose (5) and stable enough to transmit rotational force to the proximal collar fitting (3) at the distal end of the push-pull-turn hose (5).

6. An apparatus according to claim 1, wherein the proximal collar fitting (3) and/or the distal collar fitting (4) comprises two spaced flanges (13, 14).

7. An apparatus according to claim 1 wherein the proximal collar fitting (3) and/or the distal collar fitting (4) comprises an area with ribs (17).

8. An apparatus according to claim 1, wherein the proximal collar fitting (3) and/or the distal collar fitting comprises at least one through-going bore (23) that is provided with threads at both ends.

9. An apparatus according to claim 8, wherein said at least one through-going bore (23) is closed with a threaded plug.

10. An apparatus according to claim 1, wherein the distal collar fitting (4) is provided with a rounded or tapered end.

11. An apparatus according to claim 1, wherein said fluid communication between said single push-pull-turn hose (5) and the interior of the bladder (110) is located at the proximal collar fitting (3) and/or in the distal collar fitting (4) and/or in the tube (2).

12. A toolkit for assembling an apparatus for installing a liner (120) in a pipe (101) for domestic piping, said pipe including multiple pipe bends (102a, 102b), said pipe (101) having an inner diameter in the range of 35 mm to about 150 mm, said apparatus so flexible and slim that it easily passes said bends in said pipe, said toolkit consisting of:
a single push-pull-turn hose (5) with a coupling half at its distal end said single push-pull-turn hose (5) is a reinforced rubber hose with one or more layers of steel or carbon fiber mesh, said single push-pull-turn hose (5) is flexible enough to go through 90 degree bends in a 75 mm pipe but at the same time stable enough to provide a solid pushing force and torsional stability to be able to transmit a substantial rotational force to the tube assembly (1) for turning the tube assembly,
a proximal collar fitting (3) with coupling halves at each of two separate ends, said distal end of said single push-pull-turn hose (5) adapted for being connected in a releasable way to the proximal collar fitting (3),
a distal collar (4) with a coupling half at one end,
a small cross-sectional area flexible tube or rod (2) with a coupling half at both ends that matches the coupling halves on the collar fitting, and an inflatable bladder (110) made of a suitable elastic and substantially non-permeable elastomeric material and comprises a layer of fiber based fabric, said inflatable bladder configured for having one end secured to said proximal collar fitting (3) and the other end secured to said distal collar fitting (4) with said small diameter flexible tube or rod (2) disposed inside the interior of said inflatable bladder;
wherein, upon assembly of said toolkit, said single push-pull-turn hose (5) is configured for fluid communication with the interior of said inflatable bladder (110).

13. A toolkit according to claim 12, further comprising inflatable bladders (110) of different size and shape.

14. A toolkit according to claim 13, wherein said inflatable bladders (110) are bladders with two open ends.

15. A toolkit according to claim 14, further comprising further fasteners (116) for securing the open ends of the inflatable bladder (110) to said collar fittings (3, 4).

16. A toolkit according to claim 12, further comprising preformed liners of different shape and dimensions.

17. A toolkit according to claim 12, further comprising a source of pressurized air, a source of vacuum and a source of hot fluid.

18. A method for installing a liner (120) in a pipe (101) for domestic piping, said pipe including multiple pipe bends (102a, 102b), said method comprising:
providing a proximal collar fitting (3) and a distal collar (4) fitting interconnected by a flexible and small cross-sectional area tube or rod (2) to create a flexible tube or rod assembly (1),
providing an inflatable bladder (110) with two open ends, said bladder made of a suitable elastic and substantially non-permeable elastomeric material and comprises a layer of fiber based fabric,
inserting said flexible tube or rod assembly (1) into said inflatable bladder (110),
securing one open end of said inflatable bladder (110) to said proximal collar fitting (3), securing the other open end of the inflatable bladder (110) to said distal collar fitting (4) to form a bladder arrangement,
providing a single push-pull-turn hose (5) and connecting one end of said single push-pull-turn hose (5) to said proximal collar fitting (3), wherein said single push-pull-turn hose (5) is configured for fluid communication with the interior of said inflatable bladder (110), and wherein said single push-pull-turn hose (5) is a reinforced rubber hose with one or more layers of steel or carbon fiber mesh, said single push-pull-turn hose (5) is flexible enough to go through 90 degree bends in a 75 mm pipe but at the same time stable enough to provide a solid pushing force and torsional stability to be able to transmit a substantial rotational force to the tube assembly (1) for turning the inflatable bladder,
placing a curable liner (120) over said bladder arrangement, thereby forming a lining apparatus, said apparatus so flexible and slim that it easily passes said bends (102a, 102b) in said pipe (101)
inserting said bladder arrangement with said curable liner (120) into said pipe (101), and
moving said bladder arrangement with said curable liner (120) into a desired position and orientation into said pipe by pushing, pulling and/or turning said bladder arrangement with said single push-pull-turn hose (5)

wherein said single push-pull-turn hose is advanced through at least one of the multiple pipe bends.

* * * * *

(12) EX PARTE REEXAMINATION CERTIFICATE (11472nd)
United States Patent
Nilsson et al.

(10) Number: US 9,657,883 C1
(45) Certificate Issued: Mar. 5, 2019

(54) APPARATUS AND METHOD FOR INSTALLING A LINER IN A PIPE

(75) Inventors: Göran Nilsson, Stenhamra (SE); Sam Hedberg, Ingarö (SE)

(73) Assignee: REPIPER AB, Molndal (SE)

Reexamination Request:
No. 90/014,168, Jul. 17, 2018

Reexamination Certificate for:
Patent No.: 9,657,883
Issued: May 23, 2017
Appl. No.: 13/502,404
PCT Filed: Nov. 3, 2010
PCT No.: PCT/EP2010/006697
§ 371 (c)(1),
(2), (4) Date: Apr. 17, 2012
PCT Pub. No.: WO2011/057734
PCT Pub. Date: May 19, 2011

(30) Foreign Application Priority Data

Nov. 10, 2009 (SE) ...................................... 0901433

(51) Int. Cl.
*F16L 55/16* (2006.01)
*F16L 55/18* (2006.01)
*F16L 55/1645* (2006.01)
*F16L 55/163* (2006.01)

(52) U.S. Cl.
CPC .......... *F16L 55/1645* (2013.01); *F16L 55/18* (2013.01); *F16L 55/16* (2013.01); *F16L 55/163* (2013.01); *F16L 55/16455* (2013.01)

(58) Field of Classification Search
None
See application file for complete search history.

(56) References Cited

To view the complete listing of prior art documents cited during the proceeding for Reexamination Control Number 90/014,168, please refer to the USPTO's public Patent Application Information Retrieval (PAIR) system under the Display References tab.

*Primary Examiner* — Robert M Fetsuga

(57) ABSTRACT

An apparatus and method for installing a liner in a pipe, including a flexible tube assembly (2) with a proximal and a distal end, where the proximal end is attached to a proximal collar fitting (3) and the distal end is attached to a distal collar fitting (4). An inflatable bladder (110) is disposed over the tube (2) and the ends of the bladder (110) are secured to the collar fittings (3,4) forming sealed connections with the collar fittings. The proximal collar fitting (3) has connection means to connect to a guide hose (5), and includes at least one conduit for a fluid to inflate the inflatable and deflate bladder.

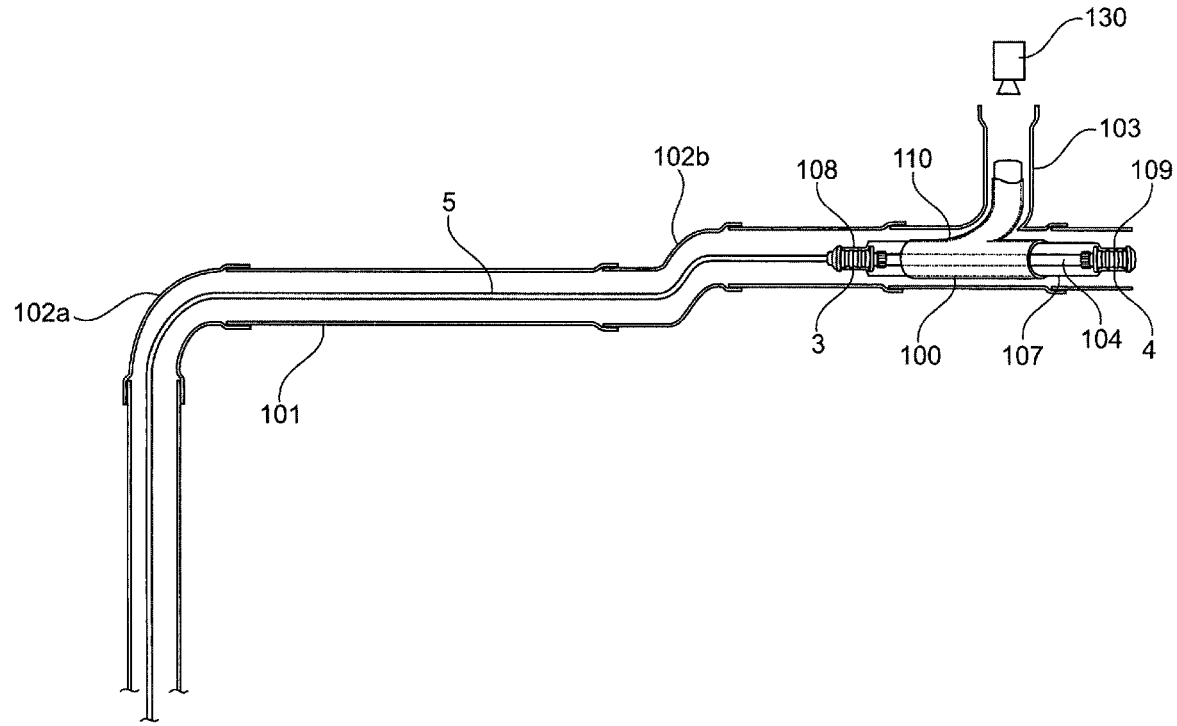

EX PARTE REEXAMINATION CERTIFICATE

NO AMENDMENTS HAVE BEEN MADE TO THE PATENT

AS A RESULT OF REEXAMINATION, IT HAS BEEN DETERMINED THAT:

The patentability of claims 1-18 is confirmed.

\* \* \* \* \*